United States Patent

Messina et al.

[15] 3,699,133

[45] Oct. 17, 1972

[54] PROCESS FOR THE PREPARATION OF OLEFINE OXIDES

[72] Inventors: Giuseppe Messina, Alghero; Giorgio Montorsi; Giuseppe Caprara, both of Milan, all of Italy

[73] Assignee: Montecatini Edison S.p.A., Milan, Italy

[22] Filed: June 10, 1971

[21] Appl. No.: 151,978

[30] Foreign Application Priority Data

June 12, 1970 Italy.....................25899 A/70

[52] U.S. Cl. ..........................................260/348.5 V
[51] Int. Cl. ...............................................C07d 1/08
[58] Field of Search...............................260/348.5 V

[56] References Cited

UNITED STATES PATENTS 3,265,716  8/1966  Dickey et al........260/348.5 V
3,346,473  10/1967  Stevenson Coffey et al......................260/348.5 V
3,379,737  4/1968  Rustin et al.........260/348.5 V

FOREIGN PATENTS OR APPLICATIONS 1,376,471  9/1964  France................260/348.5 V Primary Examiner—Norma S. Milestone
Attorney—Stevens, Davis, Miller & Mosher

[57] ABSTRACT

In the preparation of olefine oxides in liquid phase reaction between olefines, isobutyric aldehyde and oxygen in the presence of a catalyst, improvement in minimizing formation of isobutyric acid is achieved by using a titanium compound as the catalyst.

9 Claims, No Drawings

PROCESS FOR THE PREPARATION OF OLEFINE OXIDES

The present invention relates to a process for preparing olefine oxides through the reaction in a liquid phase, at temperatures between 20° and 150° C., of olefines having at least three carbon atoms with isobutyric aldehyde and with oxygen or any other oxygen-containing gas, in the presence of a catalyst.

Processes of this type are already known; however, according to the processes used so far, and in particular with the catalysts used until now, there was always observed a side-formation of great quantities of isobutyric acid, a product of little value, along with the formation of products having, on the contrary, valuable applications, such as, for instance: isopropanol, acetone and acetic acid which mostly are derived from the oxidative degradation of the aldehyde.

Thus, one object of this invention is that of providing a process of the envisaged type which will ensure the lowest possible conversion of isobutyric aldehyde into the corresponding acid and to increase the yield of useful by-products.

Still other objects will become quite evident from the following description.

It has now surprisingly been found that in the processes of the above-described type the quantity of isobutyric acid is reduced to a minimum by using as a catalyst a titanium compound. In other words, there has been found a process for the preparation of olefine oxides through the reaction in a liquid phase, at temperatures between 20° and 150° C., of olefines having at least three carbon atoms, with isobutyric aldehyde and with oxygen or any other oxygen-containing gas, in the presence of a catalyst characterized by the fact that the catalyst is a titanium compound.

Particularly convenient results are obtained by using titanium-dicyclopentadienyl-dichloride [$Ti(cpd)_2Cl_2$], though other titanium compounds may be used with equal advantage; as examples of others, there may be mentioned: tetrabutyltitanate and the other homologous alkoxy derivatives as well as titanium naphthenate, mixtures thereof and the like. The quantity of catalyst is conveniently comprised between 0.05 and 50 millimoles per mole of aldehyde.

As an oxidizing gas there may be used air or oxygen-nitrogen mixtures in $O_2/N_2$ ratios differing from the ratio corresponding to the composition of air; however, there may also be present other inert gases such as $CO_2$, noble gases, their combinations and the like.

The process is conducted at a pressure sufficient to maintain the liquid phase, that is comprised between 1 and 200 atm., but preferably between 1 and 100 atm.

The reaction is preferably conducted in the presence of an inert diluent, useful also for the disposal of heat. For purposes of illustration, there may be used as diluents the lower aliphatic alcohols, ethyl acetate, glycol-propylene diacetate and other homologous esters, chloro- and dichloro-benzene, benzonitrile, benzene, toluene as well as the reaction by-products themselves such as acetone, isopropanol, acetic acid, isobutyric acid, etc. and various mixtures thereof. In general, the quantity of diluent must be greater than 1 mole per mole of aldehyde.

The molar ratio of olefine/aldehyde is maintained at between 50 : 1 and 1 : 1, but preferably is maintained between 16 : 1 and 2 : 1. The contact time of the reactants in the reaction apparatus is between 1 minute and 10 hours, depending on the operational conditions. In general, it is, however, convenient to operate for a time period between 10 minutes and 3 hours. The reaction may be carried out by either a continuous, intermittent or semi-continuous process.

In the case of the continuous process, there are various ways that one may proceed. Thus, it is possible to introduce the liquid reactants into a tubular reactor refrigerated by an outside cooling jacket by feeding in the oxidizing gas at various points along the passage inside the reactor, and separating the products by distillation in one or more still columns; in this case there is adopted the principle of co-current contact of the liquid reactants with the oxidizing gas.

It is also possible to feed the liquid reactants to the head of a vertical reaction column (preferably of the tube bundle type, possibly packed with Raschig rings, Berl saddles or other similar materials), in countercurrent contact with the oxidizing gas; the concentration of the oxygen at the top of the column must be accurately kept under control, preferably with the help of an analyzer fitted with automatic servo-controls that will allow suitable pressurizing with inert gases, so as to avoid the oxygen concentration reaching the explosion limits. It is convenient to recycle the liquid reaction by-products after separation of the olefine oxide.

When starting the process, it is always advisable to use a diluent which may be gradually substituted by the above-mentioned recycle in the course of the reaction.

The olefines that are preferred in the practice of this invention are olefines having from three to 18 carbon atoms, optionally substituted by groups that remain inert under reaction conditions. As examples of such groups there are mentioned the halogens, the alkoxy groups, the carboxylic groups, the carbalkoxydic groups, their combinations and the like.

Particularly suitable for the purposes of this invention are olefines such as: propylene, butene-1, butene-2, isobutene, butadiene, isoprene, octene-1, octene-2, propylene trimers and tetramers, decene-1, their mixtures and the like, or their substituted derivatives such as: allyl alcohol, allyl chloride, unsaturated fatty acids and their esters, mixtures thereof and the like.

The olefinic oxides thus obtained are conveniently usable in the production of glycols and polyglycols, optionally substituted and thus, in the field of surfactants in general and detergents in particular.

Still another use for the oxides obtained according to this invention, and in particular for propylene oxide, is the preparation of polyethers for the production of polyurethane foams.

The following examples are given for merely illustrative and non-limiting purposes.

EXAMPLES 1–9

Into a stainless steel autoclave having a holding capacity of 1 liter and being fitted with a rotary stirrer and an inside cooling coil for the control of the temperature, were loaded 250 g. of propylene-glycol diacetate as a diluent, 180 g. (4.3 moles) of propylene under pressure and 0.1 g. of catalyst.

This mixture was then brought up to the temperature required for starting the reaction, while the pressure was increased 10 atm. by the injection of nitrogen. The pressure was then further increased 18 atm. by the injection of oxygen thus bringing the total pressure up to 50 atm.

At this point, by means of a metering pump, 60 cc. (0.66 moles) of isobutyric aldehyde were fed into the autoclave for 60 minutes, simultaneously reintegrating the loss of pressure by injections of oxygen.

At the end of the reaction, the reaction mixture was discharged, the propylene and the other gases present were separated and the resulting liquid residual product was subjected to a chromatographic analysis, the results of which are recorded in Table I.

Examples 3 and 4 refer to tests carried out according to this invention, with catalysts based on titanium. The other examples are given for purely comparative purposes.

What is claimed is:

1. In the process for the preparation of olefine oxides by the reaction in liquid phase, at temperatures between 20° and 150° C., of olefines having at least three carbon atoms with isobutyric aldehyde and with oxygen or other oxygen-containing gas, in the presence of a catalyst, the improvement comprising using as said catalyst a titanium compound.

2. Process according to claim 1, wherein said titanium compound is titanium-dicyclo-pentadienyl dichloride.

3. Process according to claim 1, wherein the molar ratio of olefine : aldehyde is greater than 1.

4. Process according to claim 3, wherein the molar ratio of olefine : aldehyde is between 50 : 1 and >1 : 1.

5. Process according to claim 3, wherein said molar ratio is between 16 : 1 and 2 : 1.

TABLE I

| Test number | Catalysts | Temp., °C. | Converted aldehyde in percent | Acetone plus isopropanol plus acetic acid percent | | Isobutyric acid, percent | | Propylene oxide, percent | |
|---|---|---|---|---|---|---|---|---|---|
| | | | | (+) | (++) | (+) | (++) | (+) | (++) |
| 1 | No catalyst | 105 | 85 | 65 | 55.2 | 35 | 29.8 | 45 | 38.3 |
| 2 | do | 95 | 91 | 60 | 54.6 | 40 | 36.4 | 44 | 40.0 |
| 3 | Ti(compound)₂Cl₂ | 105 | 87 | 80 | 69.6 | 20 | 17.4 | 43 | 37.4 |
| 4 | do | 95 | 85 | 70 | 59.5 | 30 | 25.5 | 45 | 38.3 |
| 5 | Mn acetylacetonate | 105 | 84 | 59 | 59.6 | 41 | 34.4 | 42 | 35.3 |
| 6 | do | 95 | 87 | 60.6 | 52.7 | 39.4 | 34.3 | 35 | 30.5 |
| 7 | Mo (Co)₆ | 105 | 84 | 65 | 54.6 | 35 | 29.4 | 37 | 31.1 |
| 8 | Co 2-ethyl-hexanoate | 95 | 87 | 63 | 54.8 | 37 | 32.2 | 39 | 33.9 |
| 9 | Co acetylacetonate | 105 | 85 | 70 | 59.5 | 30 | 25.5 | 45 | 38.3 |

+With respect to the converted aldehyde.
++With regard to the starting aldehyde.
NOTE.—Propylene=4.3 moles; aldehyde=0.66 moles; diluent=1.5 moles; time 60 minutes.

From Table I, and especially from Example (test) 3, it will be seen that the quantity of isobutyric acid obtained by making use of titanium compounds as catalysts, is at a minimum.

All other conditions, especially the reaction temperature, remained the same with respect to the quantities produced, not only in the absence of catalysts, but also in the presence of different catalysts based, for instance, on Mn, Mo or Co.

6. Process according to claim 1, wherein said oxygen-containing gas is air.

7. Process according to claim 1, wherein said olefines are olefines having from three to 18 carbon atoms.

8. Process according to claim 6, wherein said olefine is propylene.

9. Process according to claim 6, wherein said olefine is isobutene.

* * * * *